United States Patent Office 3,268,592
Patented August 23, 1966

3,268,592
PHENYL DERIVATIVES OF 4,4'-BIS(MERCAPTO-
METHYL)DIPHENYL OXIDE
George B. Sterling, Mogadore, Ohio, assignor to The Dow
Chemical Company, Midland, Mich., a corporation of
Delaware
No Drawing. Filed Dec. 26, 1963, Ser. No. 333,740
3 Claims. (Cl. 260—609)

The novel compounds of the present invention correspond to the formula

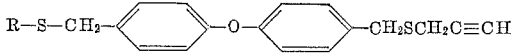

wherein R represents a hydrogen or 2-propynyl. The compounds of the present invention are organic liquids which are somewhat soluble in many common organic solvents and of low solubility in water. These compounds have been found to be useful as toxic constituents in pesticidal compositions for the control of fish, insect, mollusk, plant, bacterial and fungal organisms such as flies, snails, carp, mites, wild oats and corn.

The compounds can be prepared by reacting a propargyl halide with 4,4'-bis(mercaptomethyl)diphenyl oxide corresponding to the formula

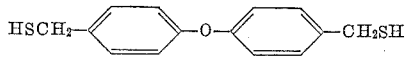

The reaction is carried out in the presence of a basic material and preferably in an organic liquid, as reaction medium, such as acetone, methyl ethyl ketone, diethyl ketone, acetone-benzene and isopropanol. The reaction takes place smoothly at a temperature at which halide of reaction is produced and preferably at temperatures from about 0 to 100° C. The halide of reaction appears in the reaction mixture as the halide salt of the metal cation from the employed base. Representative basic materials include sodium and potassium carbonate. Good results are obtained when employing one molecular proportion of the 4,4'-bis(mercaptomethyl)diphenyl oxide and greater than one molecular proportion, preferably an excess, of each of the propargyl halide and the basic material. The reaction consumes the reactants in the proportion of one mole of 4,4'-bis(mercaptomethyl)diphenyl oxide and one or two moles each of the propargyl halide and the basic material depending upon whether the mono-(2-propynyl-thio) substituted product or the di-(2-propynylthio) substituted product is desired. For optimum yields, the use of reactants in amounts which represent such proportions, is preferred.

In carrying out the reaction, the propargyl halide such as the chloride or bromide, the 4,4'-bis(mercaptomethyl) diphenyl oxide and the basic material can be combined in any convenient fashion. However, in a preferred procedure, the reactants are dispersed in an organic liquid as reaction medium. The mixture of reactants is then maintained at the reaction temperature until there is a substantial cessation in the formation of the halide of reaction, which indicates that the reaction is nearing completion. The halide of reaction can be removed by conventional procedures such as filtering the warm reaction mixture or diluting the reaction mixture with water and separating the product containing organic layer from the halide containing aqueous layer. The filtrate or the organic layer obtained during the dilution procedure can be used in pesticidal compositions or further purified by heating to remove the low boiling constituents and obtain the product as a residue.

*Example 1.—4-mercaptomethyl-4'-[(2-propynyl)
thiomethyl]diphenyl oxide*

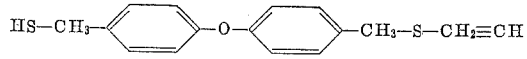

4,4'-bis(mercaptomethyl)diphenyl oxide (63 grams; 0.25 mole), propargyl halide (30 grams; 0.25 mole) and potassium carbonate (30 grams; 0.25 mole) were dispersed in 150 milliliters of acetone and 150 milliliters of benzene. The resulting mixture was heated with stirring at the boiling temperature and under reflux for twenty-four hours. The reaction mixture was then filtered to remove the halide of reaction. The filtrate was collected and heated to remove the low boiling constituents and obtain the 4-mercaptomethyl-4'-[(2-propynyl)thiomethyl]diphenyl oxide product as a liquid residue having a refractive index n/D of 1.6375 at 25° C.

*Example 2.—4,4'-bis[(2-propynyl)thiomethyl]
diphenyl oxide*

4,4'-bis(mercaptomethyl)diphenyl oxide (63 grams; 0.25 mole), propargyl bromide (70 grams; 0.59 mole) and potassium carbonate (75 grams; 0.54 mole) were processed exactly as described in Example 1 to obtain the 4,4'-bis[(2-propynyl)thiomethyl]diphenyl oxide product as a liquid residue having a refractive index n/D of 1.5855 at 25° C.

The new compounds of the present invention are useful as herbicides and parasiticides for the control of a number of plant and parasite species. For such uses, the unmodified compound can be used. The products can also be dispersed on a finely divided solid and employed as a dust. Such mixtures can be dispersed in water with or without the aid of a surface active dispersing agent and the resulting aqueous suspensions employed as a dust. In other procedures, the products of this invention can be employed as the toxic constituent in solvent solutions, oil-in-water or water-in-oil emulsions or aqueous dispersions. In representative operations, aqueous compositions containing 1 percent by weight of 4,4'-bis[(2-propynyl)thiomethyl]diphenyl oxide give substantially complete kills of two spotted spider mites. In other operations excellent kills of wild oats are obtained when 4,4'-bis[(2-propynyl) thiomethyl]diphenyl oxide is employed in soil at dosages of 50 pounds per acre.

I claim:
1. Compounds having the formula

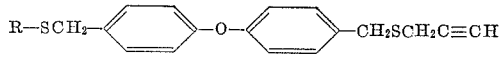

wherein R represents a member of the group consisting of hydrogen and 2-propynyl.
2. 4,4'-bis[(2-propynyl)thiomethyl]diphenyl oxide.
3. 4 - mercaptomethyl - 4' - [(2 - propynyl)thiomethyl] diphenyl oxide.

No references cited.

CHARLES B. PARKER, *Primary Examiner.*

DELBERT R. PHILLIPS, *Assistant Examiner.*